United States Patent [19]
Kiemle et al.

[11] 3,805,275
[45] Apr. 16, 1974

[54] DEVICE FOR PRODUCING A SEQUENTIAL, NON-COHERENT, REDUNDANT, OPTICAL DATA STORAGE

[75] Inventors: Horst Kiemle; Hartwig Ruell, both of Munich, Germany

[73] Assignee: Siemens Aktiengesellschaft, Berlin and Munich, Germany

[22] Filed: Sept. 21, 1972

[21] Appl. No.: 290,796

[30] Foreign Application Priority Data
Sept. 29, 1971 Germany.......................... 2148649

[52] U.S. Cl.......... 346/108, 346/107 R, 350/162 ZP
[51] Int. Cl......................... G11b 7/00, G02b 27/38
[58] Field of Search ............ 346/108, 107; 350/3.5, 350/162 ZP

[56] References Cited
UNITED STATES PATENTS

| | | | |
|---|---|---|---|
| 3,703,724 | 11/1972 | Thomas .............................. | 346/108 |
| 3,216,004 | 11/1965 | Herriott ............................. | 346/108 |
| 3,165,045 | 1/1965 | Troll .................................. | 346/108 |
| 3,653,067 | 3/1972 | Anderson et al. .................. | 346/108 |
| 3,586,412 | 6/1971 | Leith ................................. | 350/162 ZP |
| 3,700,907 | 10/1972 | Myer et al..................... | 350/162 ZP |

*Primary Examiner*—Stephen J. Tomsky
*Assistant Examiner*—Vit W. Miska
*Attorney, Agent, or Firm*—Hill, Gross, Simpson, Van Santen, Steadman, Chiara & Simpson

[57] ABSTRACT

The present invention is directed to a device for producing sequential, non-coherent, redundant, optical data storage. The device includes a source producing a non-coherent light which is modulated to produce a pulse-amplitude-modulation and then directed onto a hologram such as a one-dimensional hologram to produce a signal exposure on a light sensitive tape. The exposure of the tape by the signal exposure can be a contact exposure or the device can include an optical system such as lenses for directing the light onto the tape. To improve the ability of reading the stored data, the device includes means for applying a correction exposure to compensate for fluctuation in the intensity of the signal exposure. One embodiment utilizes a beam splitter for dividing out a portion of the pulse-modulated light, a detector to detect the intensity of the divided out portion, which detector generates a signal utilized by electronic control device that controls the operation of the source providing a light beam used to produce the correction exposure. In another embodiment, the light beam is first polarized in one direction and then modulated by rotating the direction of polarization and passed through a polarization separator which produces two beams with different directions of polarization. One beam is projected directly onto the tape to produce the correction exposure and the other beam passes through the one-dimensional hologram to produce the signal exposure. In each of the embodiments a fast light deflector may be utilized and a plurality of one-dimensional holograms utilized to enable recording multichannels of data on the tape.

7 Claims, 7 Drawing Figures

DEVICE FOR PRODUCING A SEQUENTIAL, NON-COHERENT, REDUNDANT, OPTICAL DATA STORAGE

BACKGROUND OF THE DISCLOSURE

1. Field of the Invention

The present invention is directed to a device for the production of sequential, non-coherent, redundant, optical data storage which utilizes a light beam which is pulse-amplitude-modulated depending on the signal to be recorded which beam is sequentially passed through a hologram and recorded on a moving light sensitive tape.

2. Prior Art

With prior sequential optical data storage, a signal which varied with time, was heretofore been modulated onto a laser beam by means of a pulse-amplitude-modulation and this modulated laser beam is caused to interfer with a coherent, time constant reference beam on a light sensitive storage medium. The resulting interference pattern was then recorded on a moving storage tape as a one-dimensional hologram. One hologram corresponded to each modulated pulse and the contrast produced in the hologram was a measure of the level or degree of the intensity or amplitude modulation of the pulse.

In such a device, each timing pulse produced a new hologram. Thus the mechanical stability conditions which are common in the holographic field must be maintained by the recording device during the recording process for this period. For this reason and due to their coherent properties, only lasers could be considered as practical light sources and the lasers were required to be supported with a structure which had a vibration-free construction.

SUMMARY OF THE INVENTION

The present invention is directed to a device for producing sequential, non-coherent, redundant, optical data storage which device does not rely on lasers as a light source during the recording process and thus does not require a supporting structure which is constructed to be vibration-free. The device utilizes a light source to produce a light beam which is passed through means for providing a pulse-amplitude-modulation of the beam which is then directed onto a one-dimensional hologram and then recorded as a signal exposure on a light sensitive tape. This device produces all of the advantages of the hologram storage such as high redundancy and insensitivity against local damage of the storage medium while simultaneously avoiding the drawbacks such as the complicated vibration-free constructions necessary for a coherent light source and lasers as the coherent light sources. The light emerging from the one-dimensional hologram can be recorded by a contact copying on the light sensitive tape or can be received by an optical system which directs it onto the tape. To avoid the operational point moving along the characteristic curve of the recording medium during an individual exposure, the device may be provided with means for applying a correction exposure on the light sensitive tape which means includes means for directing the correction exposure spatially and timely from the signal exposure and for controlling the intensity of the correction exposure so that the signal exposure and correction exposure produces an entire exposure of the light sensitive film or tape which is constant during each recording. One embodiment of the device utilizes a beam splitter or divider which directs a portion of the modulated beam into a photo detector which in turn produces an electrical signal recieved by an electronic control device that controls the intensity of a second light source which produces the light beam for the correction exposure. Another embodiment of the invention, the means for producing a correction exposure utilizes electrically controllable polarization device and a polarization separating filter which divides the light beams into two paths depending on the direction of polarization with one of the light beams being utilized for the correction exposure and the other going through the hologram to produce the signal exposure. In each of the embodiments, a multi-channel recording can be accomplished by providing a plurality of one-dimensional holograms and a fast light deflector for sequentially deflecting the light onto each of the holograms.

DESCRIPTION OF THE PREFERRED EMBODIMENTS

Figure 1:
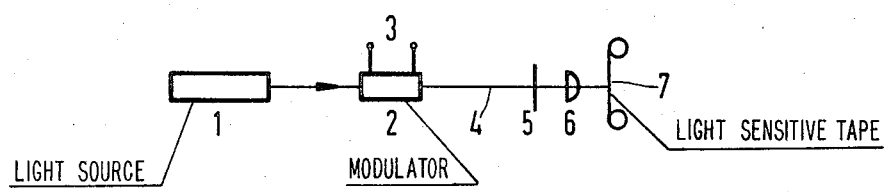
FIG. 1 is a schematic arrangement illustrating the device of the present invention.

The principles of the present invention are particularly useful in the device schematically illustrated in FIG. 1 for recording information in an optical storage. The device utilizes a non-coherent light source 1 which emits a pulse-shaped beam in a direction of the arrow which is received by a modulator 2. The information which is to be stored is provided to the modulator 2 through leads 3 and the light beam is modulated with a pulse-amplitude-modulation to produce a pulse-amplitude-modulated light beam 4 which permeates a one-dimensional hologram 5 and then is focused onto the light sensitive film or tape 7 by an optical system such as lens 6. If desired, the hologram 5, which is recorded on a photo plate, can be located adjacent to the light sensitive tape 7 so that the signal exposure is produced on the tape by a simple contact copying process which does not require the optical system 6 for focusing the beam on the tape 7.

The reading of the stored hologram images must be affected with a coherent light source of constant intensity. Since the demands for the coherence during the reproduction of holograms are much lower than during the recording, a quasi-coherent light source such as a gas discharge lamp, a luminescent diode or a laser diode will suffice when utilized with spatial and/or spectral filtering. Since the efficiency of the diffraction during the reconstruction is directly proportional to the hologram contrast, the stored information will be retrieved by an intensity sensitive detector during reading.

Since the pulse-amplitude-modulated light beam 4 may be subject to strong intensity fluctuations, it is possible that the operational point moves on the characteristic curve of the light sensitive tape or film during individual exposures. In order to prevent this, a correction exposure is carried out in such a way that the entire exposure which is composed of the signal exposure and the correction exposure remains constant during each recording. A modulated pulse of high intensity causes a high hologram contrast on the storage tape while a modulated pulse of low intensity causes a corresponding low hologram contrast due to the effects of the correction exposure.

Figure 2:
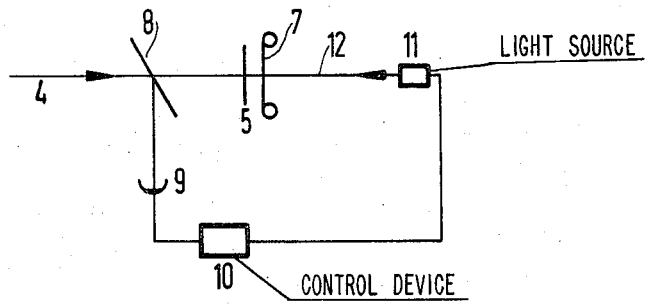
FIG. 2 is a first embodiment of the device according to the present invention.

To apply a correction exposure, means including means for providing a spatially and timely separate exposure from the signal exposure and for controlling the intensity of the correction exposure in response to the intensity of the signal exposure is utilized. A first preferred embodiment of the device is illustrated in FIG. 2 and utilizes a beam splitter or a divider 8, such as a partially transparent mirror, disposed in the path of the pulse-amplitude-modulated light beam 4 for separating or decoupling a part of the beam and directing it to a fast photo detector 9 which measures the intensity of the light beam by producing an electrical signal as an output. The output of the detector 9 is received by an electronic control device 10 which controls the intensity of the light source 11 and its time of operation which source 11 emits a correction beam 12 to produce the correction exposure. As apparent, it is essential that the correction exposure can be effected spatially and timely separate with respect to the signal exposure.

Figure 3:
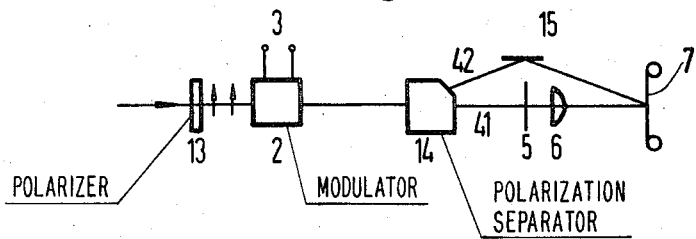
FIG. 3 is a second embodiment of the device according to the present invention.

A second preferred embodiment is a device for carrying out the correction exposure is illustrated in FIG. 3. In this embodiment of the device, the light beam is polarized by means of a polarizing device 13 and then the polarization direction is modulated by means of a modulator 2 for instance an electro-optical crystal. When the light leaves the modulator 2, it passes through a polarization separator or divider such as a Woolaston prism and is split up to become two spatially separate beams of light rays 41 and 42 which have a direction of polarization which extends substantially perpendicular to each other. As illustrated, the beam 41 is directed through the hologram 5, the optical system 6 onto the tape 7 while the beam 42 is decoupled and directed onto a mirror 15 which reflects the beam 42 onto the tape or film 7. The modulator 2 and the Wollaston prism 14 are adjusted in such a way that no light is directed on the hologram 5 when a zero voltage is applied to the modulator 2, but the correction beam 42 contains the full intensity. When a half-way voltage is applied on a modulator 2, the entire intensity entering the prism 14 is directed into the signal beam 41 and the correction beam 42 has a zero intensity.

Figure 4:
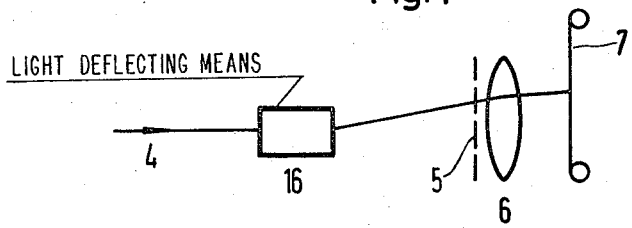
FIG. 4 is an embodiment of the device for multi-channel recording according to the present invention.

FIG. 4 schematically illustrates an arrangement which allows for the recording of information in several parallel tracks in order to reduce the band or tape advance speed of the recording medium. The device utilizes a plurality of one-dimensional holograms 5 with one hologram arranged for each track of the light sensitive tape 7. To shift the modulator beam 4 sequentially on each of the individual holograms 5, a fast light deflecting means 16 is utilized.

Figure 5:
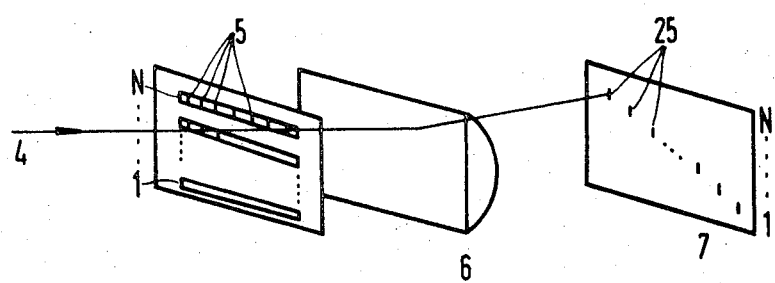
FIG. 5 is a partial perspective view illustrating an arrangement of the hologram and multi-channel recording.

A possible arrangement of the holograms 5 during a multi-channel recording is illustrated by FIG. 5. The holograms are most favorably arranged in N parallel tracks in such a way that their images 25 are staggered with respect to each other laterally from track to track during recording and thus subsequently during reconstruction of the information. This facilitates the projecting of the reconstructed information during a reading process onto the photo detectors which are arranged behind the light sensitive tape 7.

Figure 6:
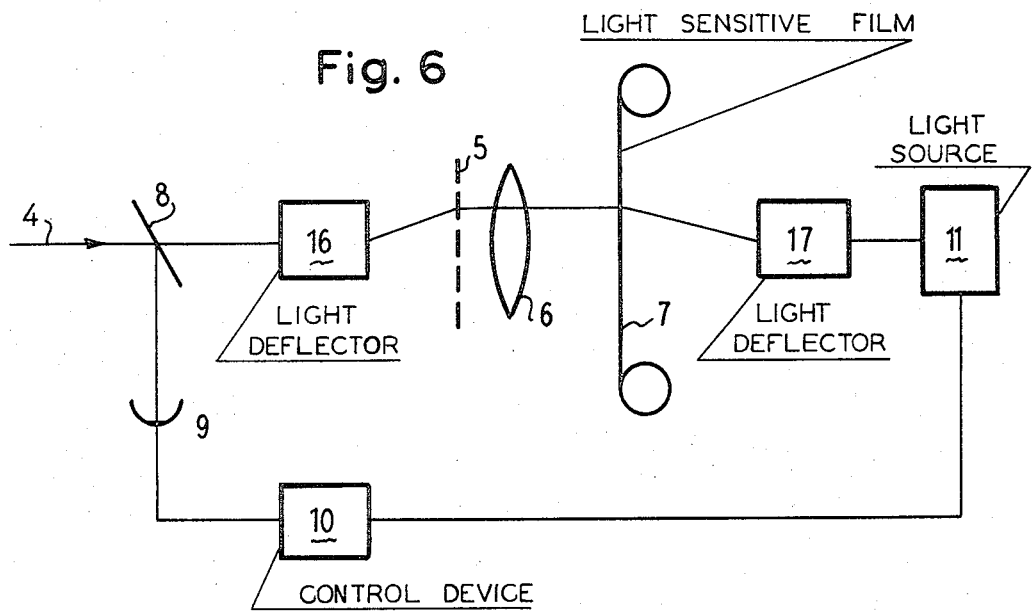
FIG. 6 is a schematic illustration of a modification of the embodiment of FIG. 2 to provide multi-channel recording.

To provide multi-channel recording for the embodiment of FIG. 2, an arrangement or device such as illustrated in FIG. 6 is utilized and includes a light deflector 16 which is arranged in the path of the light leaving the beam divider 8 prior to be projected onto the plurality of holograms 5. In addition thereto, a second light deflector 17 is arranged to deflect the correction exposure leaving the second light source 11 to project on the desired track on the film 7.

Figure 7:
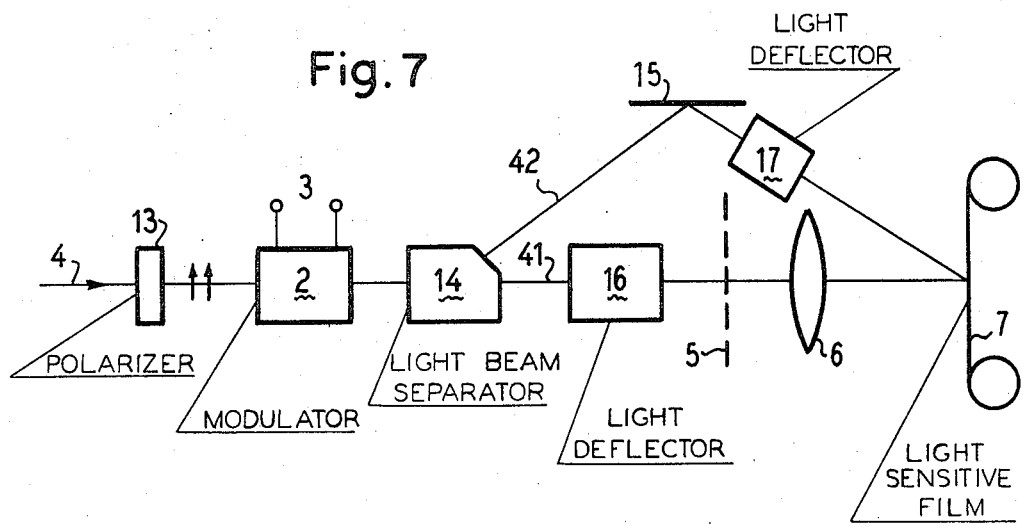
FIG. 7 is a schematic illustration of a modification of the embodiment of FIG. 3 to provide a multi-channel recording.

To provide multi-channel recording for the embodiment illustrated in FIG. 3, an arrangement such as illustrated in FIG. 7 is utilized. In this arrangement, a light detector 16 is positioned along the path of the beam 41 between the beam separator 14 and the plurality of one-dimensional holograms 5. In addition thereto, it is desirable to project the correction exposure formed by beam 42 onto the desired channel and a second light deflector 17 is arranged in the path of beam 42.

The holograms 5 may be produced by means of interference patterns of synthetically, for instance with the help of a computer. Thus conditions such as optimum contrast adjustment, intensity distribution of the reconstructed image, depth of field and similar conditions are taken into account. For instance, the contrast of the hologram 5 may be selected in such a way that the signal to noise ratio becomes a maximum for the intensity occuring during recording of the desired signals. Furthermore the hologram 5 may be dimensioned in such a way that the depth of field becomes as great as possible. The hologram 5 for instance may be a dot which has the effect of a one-dimensional fresnel zone plate.

Although various minor modifications might be suggested by those versed in the art, it should be understood that we wish to employ within the scope of the patent granted hereon all such modifications as reasonably, and properly come within the scope of our contribution to the art.

We claim:

1. In a device for recording sequential, non-coherent, redundant, optical data on a storage medium comprising a light source producing a light beam, means for pulse-amplitude-modulating the light beam depending on a signal to be recorded, at least one one-dimensional hologram arranged in the path of the modulated light beam, and means for supporting and moving a light sensitive tape in a path of the light beam passing through the hologram so that a pulse-amplitude-modulating light beam passing through the hologram is recorded on a tape as a signal exposure, the improvements comprising means for providing a correction exposure on the light sensitive tape including means disposed between the modulating means and the one-dimensional hologram for decoupling a portion of the light beam from the path, and means utilizing the decoupled portion of the light beam for providing the correction exposure on the light sensitive tape which correction exposure is spatially and timewise separate from the signal exposure of the light sensitive tape so that the entire exposure of the light sensitive tape resulting from the signal exposure and the correction exposure is constant during each recording.

2. In a device according to claim 1, wherein a plurality of one-dimenional holograms are provided and which device includes a fast light deflector disposed in the path of the light beam for deflecting the pulse-modulated light beams sequentially on each of the one-dimensional holograms to create a multi-channel recording of the light sensitive tape.

3. In a device according to claim 1, which further includes an optical lens system arranged between the one-dimensional hologram and the light sensitive tape for directing the light beam passing through the hologram onto the tape.

4. In a device according to claim 1, wherein the means for decoupling comprises a beam divider disposed in the path of the pulse-amplitude-modulated light beam to decouple a portion therefrom, and wherein the means utilizing the decoupled portion includes a photo detector to detect the intensity of the decoupled portion, an electronic control device and a second light source for directing a beam of light onto the light sensitive tape to form the correction exposure whereby the control device controls the intensity of the second light source and the time of application in response to the intensity of the decoupled light detected by the photo detector.

5. In a device according to claim 4, wherein the one-dimensional hologram is one of a plurality of one-dimensional holograms, and which device includes a fast light deflector disposed between the beam divider and the holograms for deflecting the pulse-modulated light beam sequentially on each of the one-dimensional holograms to create a multi-channel recording on the light sensitive tape.

6. In a device according to claim 1, wherein the means for producing a correction exposure includes means polarizing the light beam coming from the source to one direction, said modulating means modulating the direction of polarization of the polarized light beam in response to a signal to be recorded, and said means for decoupling including means for separating the light beam into two beams with the direction of polarization of one beam being perpendicular to the direction of polarization of the other beam, one of the two beams being applied directly to the light sensitive tape to provide a correction exposure and the other beam of the two beams being projected through the hologram and onto the tape as a signal exposure.

7. In a device according to claim 6, wherein the one-dimensional hologram is one of a plurality of one-dimensional holograms and which device further includes a fast light deflector disposed between the light beam separator and the plurality of one-dimensional holograms for deflecting the light beam projected onto the holograms to each hologram sequentially to record multi-channels on the light sensitive tape.

* * * * *